(12) United States Patent
Böckmann

(10) Patent No.: US 11,697,468 B2
(45) Date of Patent: Jul. 11, 2023

(54) BICYCLE, BICYCLE ASSEMBLY AND METHOD

(71) Applicant: DT SWISS INC., Grand Junction, CO (US)

(72) Inventor: Frank Böckmann, Biel (CH)

(73) Assignee: DT SWISS INC., Grand Junction, CO (US)

( * ) Notice: Subject to any disclaimer, the term of this patent is extended or adjusted under 35 U.S.C. 154(b) by 1116 days.

(21) Appl. No.: 16/376,815

(22) Filed: Apr. 5, 2019

(65) Prior Publication Data

US 2019/0315432 A1 Oct. 17, 2019

(30) Foreign Application Priority Data

Apr. 11, 2018 (DE) .......................... 102018108589.3

(51) Int. Cl.
| | | |
|---|---|---|
| *B62K 3/00* | (2006.01) | |
| *B62K 25/04* | (2006.01) | |
| *G10L 15/22* | (2006.01) | |
| *B62M 6/50* | (2010.01) | |
| *B62M 6/90* | (2010.01) | |
| *B62J 43/13* | (2020.01) | |
| *B62J 43/20* | (2020.01) | |
| *B62J 45/412* | (2020.01) | |

(Continued)

(52) U.S. Cl.
CPC ..................... *B62K 3/00* (2013.01);
*B62J 3/10* (2020.02); *B62J 43/13* (2020.02);
*B62J 43/20* (2020.02); *B62J 45/412*
(2020.02); *B62K 25/04* (2013.01); *B62M 6/50*
(2013.01); *B62M 6/90* (2013.01); *B62J 1/08*
(2013.01); *B62J 6/028* (2020.02); *B62J 6/04*
(2013.01); *B62J 50/22* (2020.02); *B62J 2001/085* (2013.01); *B62K 2025/044* (2013.01); *G10L 15/22* (2013.01)

(58) Field of Classification Search
CPC ...... B62K 2025/044; B62K 3/00; G10L 15/22
See application file for complete search history.

(56) References Cited

U.S. PATENT DOCUMENTS

| 7,703,568 B2 | 4/2010 | Ishii |
|---|---|---|
| 8,781,680 B2 | 7/2014 | Ichida et al. |

(Continued)

FOREIGN PATENT DOCUMENTS

| DE | 102011117977 B3 | 12/2012 |
|---|---|---|
| DE | 102016213683 A1 | 2/2018 |

(Continued)

OTHER PUBLICATIONS

German Search Report from German Patent Application No. 10 2018 108 589.3, dated Dec. 3, 2018.

(Continued)

*Primary Examiner* — Tony H Winner
(74) *Attorney, Agent, or Firm* — Greer, Burns & Crain, Ltd

(57) ABSTRACT

A bicycle and method and bicycle assembly for a bicycle including a control device and at least one bicycle component whose operating state is variable during operation. An acoustic device with a sound converter is included for outputting information, controlled by the control device, on the operating state of the bicycle component by means of the acoustic device, and/or for capturing noises by means of the acoustic device and converting these to noise signals and utilizing them for controlling.

15 Claims, 4 Drawing Sheets

(51) Int. Cl.
*B62J 3/10* (2020.01)
*B62J 1/08* (2006.01)
*B62J 6/04* (2020.01)
*B62J 50/22* (2020.01)
*B62J 6/028* (2020.01)

(56) References Cited

U.S. PATENT DOCUMENTS

| | | | |
|---|---|---|---|
| 9,051,988 B2 | 6/2015 | Battlogg et al. | |
| 9,824,689 B1 | 11/2017 | Shapiro | |
| 10,406,884 B2 * | 9/2019 | Oakden-Graus | ............................ B60G 17/01933 |
| 10,457,349 B2 * | 10/2019 | Voss | ........................ B62K 25/30 |
| 10,723,413 B2 * | 7/2020 | Fossato | .................... B62J 45/00 |
| 11,021,210 B2 * | 6/2021 | Komatsu | ..................... B62J 1/02 |
| 11,110,913 B2 * | 9/2021 | Krosschell | ............ B60W 10/04 |
| 2006/0064223 A1 * | 3/2006 | Voss | ........................ B62K 25/04 701/52 |
| 2010/0010709 A1 * | 1/2010 | Song | ........................ B62M 25/08 701/37 |
| 2010/0198453 A1 | 8/2010 | Dorogusker et al. | |
| 2019/0118887 A1 | 4/2019 | Kinuhata et al. | |

FOREIGN PATENT DOCUMENTS

| | | |
|---|---|---|
| EP | 2939857 A2 | 11/2015 |
| EP | 3275773 A1 | 1/2018 |
| KR | 20040035151 A | 4/2004 |
| WO | 98/46474 A2 | 10/1998 |
| WO | 2018/056819 A2 | 3/2018 |

OTHER PUBLICATIONS

European Search Report from corresponding European Patent Application No. 19167607.1, dated Aug. 14, 2019.
Extended European Search Report received for EP 19167607.1, dated Jun. 23, 2022.

* cited by examiner

BICYCLE, BICYCLE ASSEMBLY AND METHOD

BACKGROUND

The present invention relates to a bicycle assembly for an at least partially muscle-powered bicycle, and in particular a mountain bike, racing bicycle or roadster comprising a control device and at least one bicycle component whose operating state is variable or modifiable during operation, and a method for operating.

The prior art has disclosed a great variety of bicycles and bicycle assemblies comprising one or more bicycle components, where the operating state of at least one bicycle component is variable during operation, and further comprising a control device such as a bicycle computer.

Many of these types of bicycle assemblies and bicycles provide for active modification of the operating state of at least one bicycle component during operation. For example, most bicycles comprise a gear shift device the transmission ratio of which can be actively modified by the user. Mountain bikes show at least one damper device as a rule. Many mountain bikes comprise a suspension fork for springing and damping the front wheel and a rear wheel damper for damping shocks to the rear wheel. Most front wheel dampers or rear wheel dampers comprise adjustment members for adjusting settings prior to or even during riding. Some of the bicycle components are provided for direct electrical control or for manual or electrical actuation by means of a Bowden cable. Some of the bicycle components provide for manual adjustment of the settings.

While operating bicycles, bicycle assemblies and bicycle components the cyclist may experience difficulties with knowing which settings are currently active in which components. Another difficulty is, changing the settings of the various components during riding. For example, when riding steeply downhill on a mountain bike through relatively rough terrain it may be difficult or even impossible for a cyclist to read or change the settings of the various components during the ride. He must rely on his feel or his memory. The handlebar has displays for gear shifting, but the display is small and during demanding downhill rides the cyclist cannot read the display just any time because he needs to keep his eyes on the track and cannot focus very long on a small display on the handlebar until the information is retrieved and understood.

It is therefore the object of the present invention to provide a bicycle assembly, a bicycle and a method allowing the user to maintain an improved overview of the settings and/or to provide more ease of modifying settings during or prior to riding.

SUMMARY

A bicycle assembly according to the invention for an at least partially muscle-powered bicycle comprises a control device, and at least one bicycle component whose operating state is variable and in particular modifiable during operation. The bicycle assembly comprises at least one acoustic device having in particular at least one sound converter for outputting information, controlled by the control device, on the operating state of the bicycle component by means of the acoustic device and/or for capturing noises by the or another acoustic device and converting these to noise signals, utilizing them for controlling.

The noise signals are in particular transmitted to the control device. The at least one acoustic device preferably comprises at least one sound converter. In particular, at least one sound converter is provided as an output device and at least one sound converter, as a capturing device. The capturing device or a sound converter may be a microphone. The output device or a sound converter may be a loudspeaker. The noise signals are in particular electric and/or electromagnetic signals. The signals may be analog and in particular digital or digitalized signals.

Preferably, the control device comprises at least one processor. The control device of the bicycle assembly is in particular configured and set up to convert noise signals to control commands. The control device of the bicycle assembly is in particular configured and set up to execute a control command upon actuation of an actuating device within an assigned time slot and to execute a control command without acknowledgment by an actuating device (preferably exactly only) if the control command only serves to output information.

It is preferred that the control device is configured and set up to basically execute a control command converted from a noise signal or a number of noise signals only in the case that an actuating device is actuated in an assigned time slot and to execute a control command converted from one (or several) noise signal(s) without acknowledgment by an actuating device only exactly in the case that the control command only serves to output information (or is not safety critical).

This means in particular, that the control device of the bicycle assembly or of a bicycle is configured and set up to convert a noise signal captured by the acoustic device to a control command and to execute it if an actuating device is actuated within an assigned time slot and to convert a noise signal captured by the acoustic device to a control command and to execute it without acknowledgment by an actuating device (preferably exactly only) if the noise signal captured by the acoustic device and converted to a control command only serves to output information.

A noise signal that is captured by the acoustic device and converted to a control command may also be referred to as an acoustic control command. The speech command that is converted to a control command may also be referred to as a speech control command.

A bicycle assembly according to the invention has many advantages. A considerable advantage of the bicycle assembly according to the invention is that the acoustic device can output information about the operating state of the bicycle component and/or that the acoustic device can be used to (actively) control the bicycle component. This allows easy handling during operation.

The sound converter in the sense of the present invention is understood to mean any means or device which converts acoustic signals to electric and/or digital signals or vice versa. Sound converters in the sense of the present invention are sound receivers and sound transmitters or sound generators. A sound converter preferably converts acoustic signals to at least one electric magnitude (voltage, current) or an electric magnitude (voltage, current), to acoustic signals. Examples of sound converters include in particular microphones, acoustic sensors and other sound receivers, and sound transmitters such as loudspeakers or other acoustic generators or vibrating devices emitting audible, acoustic sound.

For example, when the rider of a bicycle so equipped is on a steep downhill ride, approaching a valley basin after which the track climbs uphill again, the cyclist may be interested in determining which is the gear speed currently set. However, rough conditions such as roots, rocks and the like may rob the rider of time or opportunity to visually check the settings at the handlebar or the bicycle computer or the like. Then, the rider may for example issue a speech command or an acoustic signal causing the acoustic device to output the current status information about the gear shift device.

A bicycle assembly comprises in particular a control device and at least one bicycle component whose operating state is variable during operation, and at least one acoustic device with at least one sound converter to output by means of the acoustic device, controlled by the control device, information on the operating state of the bicycle component.

In another configuration, the bicycle assembly comprises a control device and at least one bicycle component whose operating state is variable during operation, and at least one acoustic device with at least one sound converter for capturing noise and converting it in particular to electric and/or digital noise signals. The noise signals can be transmitted to the control device.

A preferred embodiment of all the configurations comprises at least one bicycle component among a group of bicycle components comprising active and passive bicycle components such as a front wheel, a rear wheel, a damper device such as a damper device for damping the front wheel and a damper device for damping the rear wheel, at least one sensor for capturing the state of a damper device, a front light, a rear light, a height-adjustable seat post, a gear shift device, an electric drive motor (for an E-bike), a battery unit (for an E-bike), a pressure measuring device for the air pressure in the front wheel, a pressure measuring device for the air pressure in the rear wheel, a pressure measuring device for the air pressure and/or oil pressure, a speed sensor, an angle sensor, a position sensor and a height sensor and the like. The system may also comprise pedaling frequency sensors, pulse sensors and GPS sensors, performance sensors such as sensors for capturing the rider's pedaling performance and/or other sensors such as power sensors for measuring air drag or air resistance measurement systems and the like. At least one performance measurement system may be comprised.

Prompts and/or signals may be provided for acoustic, optical and/or vibrating output etc.

It is also possible and preferred to emit a prompt or signal output as the system has fallen below and/or exceeds a threshold value. It is, e.g. possible for the bicycle or two-wheeled vehicle or the control device to prompt the rider to apply more power to the pedals, to make greater or less effort or, e.g. to emit "push harder". It is also possible to alert the rider if the pedaling frequency, heart rate, speed, the gradient or falling gradient falls beneath, or exceeds, a threshold value.

It is for example, very advantageous to capture and monitor the air pressure in a front wheel and/or a rear wheel during operation. Then the rider may be alerted in the case of sudden or creeping pressure loss.

A bicycle assembly comprising a damper device for the front wheel and/or the rear wheel allows to output status information on the current settings of the damper devices and/or the operating states. For example, the operating temperature of the damper device or of the oil used in the damper device may be monitored and output. Moreover, the low-speed damping and high-speed damping settings and lockout settings if any may be output. Optionally, the damper device may be set and adjusted by way of noises or acoustic signals.

A height-adjustable seat post allows activation of a motorized or mechanical drive, such as a hydraulic or pneumatic drive or the like, to carry out height adjustment of the seat post. The current settings of a gear shift device may be output acoustically or shifting gears may be initiated acoustically.

A bicycle assembly having a front light and/or rear light allows switching of the light on and off for example by speech commands.

A bicycle assembly used in a bicycle having an electric drive motor and a battery unit may, for example provide for outputting and/or setting the status of the battery unit and the set assistance stage by the electric drive motor.

It is also possible to have the measurement data output by speed sensors e.g. of the bicycle, angle sensors, location sensors, position sensors and height sensors.

Preferably, the bicycle assembly and in particular, the control device and/or an assigned and particularly preferably local processing unit comprises at least one processor configured and set up to convert noise signals to control signals and in particular control commands.

The noises or noise signals are preferably converted locally in the control device and/or a locally assigned processing unit. This means that conversion of the noise signals to control commands or control signals occurs, in particular in the control device or an assigned bicycle computer or within a locally present mobile telephone or the like. It is particularly preferred for the noises and noise signals to be processed locally immediately on the bicycle component or the bicycle assembly or the bicycle. It is a significant advantage that no network interconnection is required, for example with a mobile radio network or other networks for processing the noises. This is significant for a wide circle of users since the tours and routes typically used by cyclists in particular in open terrain and also on roads do not tend to always provide for mobile radio reception. Disconnection would lead to loss of function. Specifically, trails and mountain rides tend to be in regions not providing for sufficient or sufficiently stable mobile radio networks.

With a network available, it is possible to download and/or install updates of the system, of single interfaces, drivers, program parts and/or applications. This offers ease of maintaining the system and keeping it up-to-date. Updates may be installed upon manual acknowledgment or time-shifted. Thus, the rider may receive, lease, test, enable and/or purchase additional features.

It is another substantial aspect that central processing on a remote server may lead to inconvenient response times or inconvenient time delays if signals are first routed via the internet to the server that may be far removed where processing then takes place. Depending on the linkup speed and location, this might result in inconvenient or inadmissible delays in the processing of speech commands. The results would be useless. The rider does not really need, for example a noise analysis if he wishes to be informed about the current damper device(s) or gear shift device settings with the response taking several seconds to arrive because the signal link is weak and much data needs to be transmitted and analyzed. This is why known systems such as "Siri" by Apple or "Alexa" by Amazon do not work sufficiently reliably in open terrain. These systems transmit the speech data to remote servers of the manufacturers where they are analyzed. This requires a comparatively broad internet bandwidth and costs transmission and processing time. Since, in open terrain or outside cities mobile internet connections tend to show narrow bandwidth and high latency, transmitting digitized speech may take longer than the user can or wants to wait for a reaction or response.

Therefore, the processor (or processors) for processing the noise signals is basically provided to be local. The processor may be disposed in a computing device in the control device and/or in the bicycle computer, and/or in an assigned mobile telephone, if the pertaining computing device is local. In the sense of the present invention, the term "local" is understood to mean a distance of less than 100 m, and in particular less than 5 m or preferably less than 2 m. The computing device is preferably mounted to the bicycle or is carried on the rider's person.

The assigned processing unit is connected with the control device in particular via standard interfaces. Cable or wireless connection is possible. A suitable connection may be established via standardized technologies/protocols such as in particular Bluetooth or ANT+ or WLAN or other.

Preferably, the processor is configured and set up to convert at least one noise or at least one noise sequence and, in particular at least one speech command to a control command. Particularly preferably, the control device is configured and set up to recognize at least one specified number of speech commands. For example, a specified quantity of 10, 20, 30, 40 or 50 or more different speech commands may be provided which may be programmable and in particular trained. Thus, the user may extend a preset quantity of speech commands by further, user-specific speech commands. The speech commands may preferably be trained for optimal recognition. A quantity between 5 and 50 or between 5 and 20 speech commands is preferred and permits an improved recognition rate.

Preferably, the processor comprises at least one recognition routine to reliably recognize the speaker of a speech command. A speech command is in particular executed only upon (nearly unambiguous) speaker identification, preferably from a probability of above 80% and in particular above 90% or 95%. Speech training to improve the recognition rate may be repeated at undetermined or specific intervals or upon departure. This improves the quality of recognition. A control device or a bicycle computer may include a number of different user profiles. Thus, a user may activate his profile, e.g. by voice control or manually to thereafter achieve a high recognition rate and reliability.

Preferably the control device is configured and set up to execute a control command only if the speaker shows adequate authorization. One aspect is that the speaker in question is recognized in the first place. Thus, it is possible to exclude unknown speakers and to directly discard their speech commands.

Further, it is also possible to provide different authorizations for different persons. Thus, for example certain persons such as beginners can only change simple settings, while other persons such as advanced users receive or can be enabled for broader authorizations, thus enabling the use of more specific or advanced functions.

It is also possible to reserve specific settings for authorized service personnel only to protect users from defective settings. Speech commands for a basic setup may be provided for service personnel and specifically experienced users or also beginners.

All the configurations may provide for the control command to be triggered by specific acoustic sequences of notes. Speech commands are preferably used as acoustic sequences of notes. Other tones or sequences of notes such as whistling or hooting etc. to trigger events or control commands are likewise conceivable. Standardized (or freely defined and individual) codewords are also possible.

In preferred embodiments, the control device is configured and set up to execute a control command only upon actuation of a mechanical or other actuating device in an assigned time slot.

A speech command is preferably executed only if the (mechanical) actuating device is actuated in a time slot assigned to the instant of the speech command. For example, the time slot may begin as the speech command starts and continue for a specified length of time. For example, a specific length of time of 10, 20, 30, 50, 100, 200 or 500 or 1000 or 2000 ms is possible. A longer length of time is also possible for the time slot. The length of a time slot may depend on the type of the control command. If confirmation is given within the pertaining time slot, the control command is executed. The length of a time slot may also depend on the user and be specified individually.

Alternately, it is possible for a speech command to be accepted only within a certain time after actuating an in particular mechanical actuating device. Then, the actuation marks the beginning of the time slot.

In these configurations, a short tap prior to, or pressing during or shortly after, the action may be sufficient.

It is also possible for specific control commands to not require mechanical confirmation, while other control commands require a mechanical confirmation by actuating a mechanical device. Thus, for example, the command "lights on" is not safety-relevant and might be executed without mechanical actuation. Lights out may be safety-relevant in the evenings and may require confirmation.

Modifying the damper device settings or shifting the gear shift device may be safety-relevant and is preferably only executed upon actuation, in particular mechanical, or some other acknowledgment.

A mechanical or other confirmation may be useful for example, for cyclists riding in a group with other riders who also have voice control. In these cases, it is important to make sure that only speech commands of the pertaining rider are executed while the speech commands of other riders are preferably ignored. In many cases, it may be sufficient to recognize the voices and to discard execution if a voice cannot be attributed to the rider. In some cases, it may suffice to use the sound level as a distinguishing feature. When in doubt, a required confirmation may provide the required safety.

It is also possible and preferred to analyze the voices of other riders during riding to thus achieve a more precise differentiation between the user's speech commands and conceivable speech commands of other riders.

In simple configurations, the actuating device is a mechanical actuating unit and for example, a push button or a switch. The (mechanical) actuating device is preferably disposed at the handlebar of the bicycle. A confirmation of speech commands or initializing a time slot for acknowledging speech commands by means of a push button or switch or the like allows to increase safety and reliability.

In preferred configurations, the control device is configured and set up to execute control commands without actuating a mechanical actuating device or the like, in particular if the control command only serves to output information.

In all the configurations, it is possible and preferred for the control device to acknowledge a recognized control command by way of an acknowledgment signal. This acknowledgment signal may be provided for optical or acoustic or vibrating output. A preferred acoustic output is for example a beep. In addition, or instead, an optical indication for example by way of a flashing light is possible.

This acknowledgment signal may show differences depending on the executed acknowledgment.

A signal light such as a flashing light might be incorporated in goggles or a helmet.

Signals might be output as a vibration signal by means of at least one jolting device or vibrating device. Feedback by way of a vibration element or several vibration elements is conceivable. At least one vibration element may be disposed in and/or on the helmet, in and/or on the handlebar, in and/or on a glove or shoe or the like or on other devices and objects.

The control device preferably controls an active bicycle component by way of control commands. An active bicycle component is preferably provided with at least one actuator. Preferably, at least one damper device is set and adjusted by speech commands. For example, the damping may be set softer or harder. Setting a lockout is also feasible by way of speech commands. A seat post may be extended and/or retracted by way of speech commands. The lights may also be switched on or off by way of speech commands. An electric auxiliary motor of an E-bike may be connected, adjusted or disconnected through speech commands. An engine brake may be activated in downhill rides. Potentially, speech commands may be used for activating brake energy recuperation, utilizing downhill rides for recharging the battery unit at least partially. An active bicycle component may also be a gear shift device whose transmission ratio is actively modified.

In all the configurations, it is preferred for the acoustic device to have an assigned voice output device. Voice input and voice output are in particular conceivable by way of the acoustic device or two different acoustic devices.

Particularly preferably, the control device is set up and configured to output warnings by means of the acoustic device if a bicycle component such as a damper device or a brake or brake flank exceeds a specified temperature or if the air pressure in a tire changes, or if for example, a knockout occurred or is imminent in a damper device. This warning may, for example be output for a damper device if more than 90% or 95% of the suspension travel or damping travel has been used. Then the user is warned to optionally adjust harder damping.

Advantageous specific embodiments provide that upon receiving a control command, at least one status information is emitted acoustically by means of the acoustic device, and/or optically by means of a display device and/or by way of a vibrating or jolting device.

Particularly preferably, the bicycle component comprises a suspension control and in particular at least one damper device.

In preferred configurations, the acoustic device allows adjustment of basic settings such as "comfort", "race", "racing", "touring", "downhill", "hill descent", "uphill", "hill ascent", "lockout", "block" or the like for at least one ride. Further different basic settings may be set and adjusted as well. These basic settings may apply for one ride or for several rides. For example, if the user wants to go on an after-work tour on his mountain bike or E-bike, different settings would make sense than for riding a tour through open terrain or riding a downhill tour. Voice control quickly executes any changes.

In all the configurations, it is also possible and preferred for the acoustic device to generally, intermittently or continuously, capture noises and convert to noise signals, evaluating the noise signals, for example to recognize a type of way or a type of terrain. Thus the kind of noises allow recognition of whether the rider travels over a smooth, asphalted road or through squashy terrain or a gravel road. This recognition of a type of terrain may be used to automatically activate suitable damper settings. It is also possible to use recognition of the type of terrain for making acoustic or optical suggestions to the user for particular settings. This makes sense if the user wishes to make his own decisions or if there are no actuators for automatic settings.

The noises captured and converted to noise signals may also be used, instead of or in addition to terrain recognition, for detecting damage to bicycle components. Damage detection is advantageous. If bicycle components with defects or requiring servicing emit other kinds of noises and/or other signal levels than do fully functional components, a recommendation for maintenance may be output or damage recognition carried out as divergence between actual and expected noises is recognized. Recognition may be carried out and the user may be warned of damage or a different characteristic.

Another bicycle assembly according to the invention for an at least partially muscle-powered bicycle with at least one shock absorber device and at least one control device includes, as part of the shock absorber device, a controlled damper device and/or controlled spring unit. The control device allows setting and adjusting the damping and springing of the shock absorber device. An acoustic device is provided for capturing noises which are converted to control commands to be used for controlling the control device. This acoustic device comprises, in particular, an acoustic receiver and preferably an acoustic output device. Preferably, the acoustic device is suitable and configured to output noises.

The control device is in particular configured and set up to execute a control command derived from a noise signal when an actuating device is actuated in an assigned time slot, and to execute a control command derived from a noise signal without acknowledgment by an actuating device (preferably exactly only) if the control command derived from a noise signal only serves to output information.

A two-wheeled vehicle according to the invention, such as in particular, an at least partially muscle-powered bicycle or E-bike comprises in particular, at least one frame and preferably at least one front wheel and in particular at least one rear wheel and at least one bicycle assembly having at least one bicycle component the operating state of which is variable or modifiable during operation. At least one acoustic device having in particular at least one sound converter is comprised for outputting information, controlled by the control device, on the operating state of the bicycle component by means of the acoustic device and/or for capturing noises by means of the acoustic device and converting these to noise signals, utilizing them for controlling.

The two-wheeled vehicle or bicycle according to the invention also has many advantages.

A method according to the invention operates a bicycle assembly or an at least partially muscle-powered bicycle, wherein a control device and at least one bicycle component are comprised whose operating state is variable or modifiable during operation. The control device serves for controlled output of information on the operating state of the bicycle component by means of an acoustic device and/or the acoustic device captures noises, converts these to noise signals and uses them for controlling.

A control command derived from a noise signal is executed in particular when an actuating device is actuated in an assigned time slot and a control command derived from a noise signal is executed without acknowledgment by an actuating device (in particular exactly only) when the control command derived from a noise signal only serves to output information.

The method according to the invention is also very advantageous. In preferred specific embodiments process steps as described above are carried out.

In all the configurations, the invention preferably provides a voice control for a bicycle or a suspension control or at least one bicycle component. Controlling by way of noises and, in particular, voice control can preferably be deactivated in all the cases. Control is preferably bi-directional so that speech commands can be input and a voice is output. Alternatively, or additionally other kinds of signal output and/or signal input are possible such as noises, lights, vibrations etc.

This control by noise and by voice allows more ease of operating a bicycle or a bicycle component, including in the case that the rider is for example tired.

The invention is particularly advantageous when used in mountain bikes or racing bicycles or E-bikes. A mountain bike permits, for example, voice control of a damper device. Status queries of the damper device and/or the gear shift device are also possible. The invention is not only suitable for pure bicycles, but it may be used in two-wheelers or multicycles which are at least partially muscle-powered and/or equipped with electric assist.

At the beginning of a tour, the user may, for example, announce a track type and then the suitable settings are made.

Status information queries on particular bicycle components are possible wherein the status information is in particular output by voice.

A given speech command preferably involves feedback. Critical speech commands or unclear recognition or attribution of a speech command may result in refusal to execute such speech command. It is possible to require confirmation of speech commands or announcements of speech commands for example by mechanical push button or the like. Users may actuate such a mechanical push button or switch e.g. from the handlebar without having to move their hand away from a safe position. The handlebar does not need to be released, and the rider may keep looking on the road or the trail which is decisively advantageous. Also, the rider does not need to focus his attention on the bicycle computer or the like to then refocus on the path, which also saves precious time in the terrain due to not having to focus and refocus, thus increasing safety.

The invention also allows active trouble signals, such as for air pressure loss or warning of a heated damper or a knockout.

It is also possible to provide a sequential program for a setup which prompts the user by voice control to execute appropriate steps and settings.

The invention is suitable for a great variety of bicycles. Using a damper device allows the use of conventional dampers. Dampers using a magnetorheological fluid for a damping medium may also be used.

Controlling particular components may be provided, for example, by actuators for adjusting knobs and the like to actively convert speech commands.

Further advantages and features of the present invention can be taken from the exemplary embodiment which will be described below with reference to the enclosed figures.

BRIEF DESCRIPTION OF THE DRAWINGS

The figures show in.

DETAILED DESCRIPTION

With reference to the enclosed figures, an exemplary embodiment of a bicycle 200 equipped with several bicycle assemblies 10 will be discussed below. The bicycle assemblies 10 show a shared control device 60 overall. It is also possible for each of the bicycle assemblies 10 to comprise its own control device.

Figure 1:
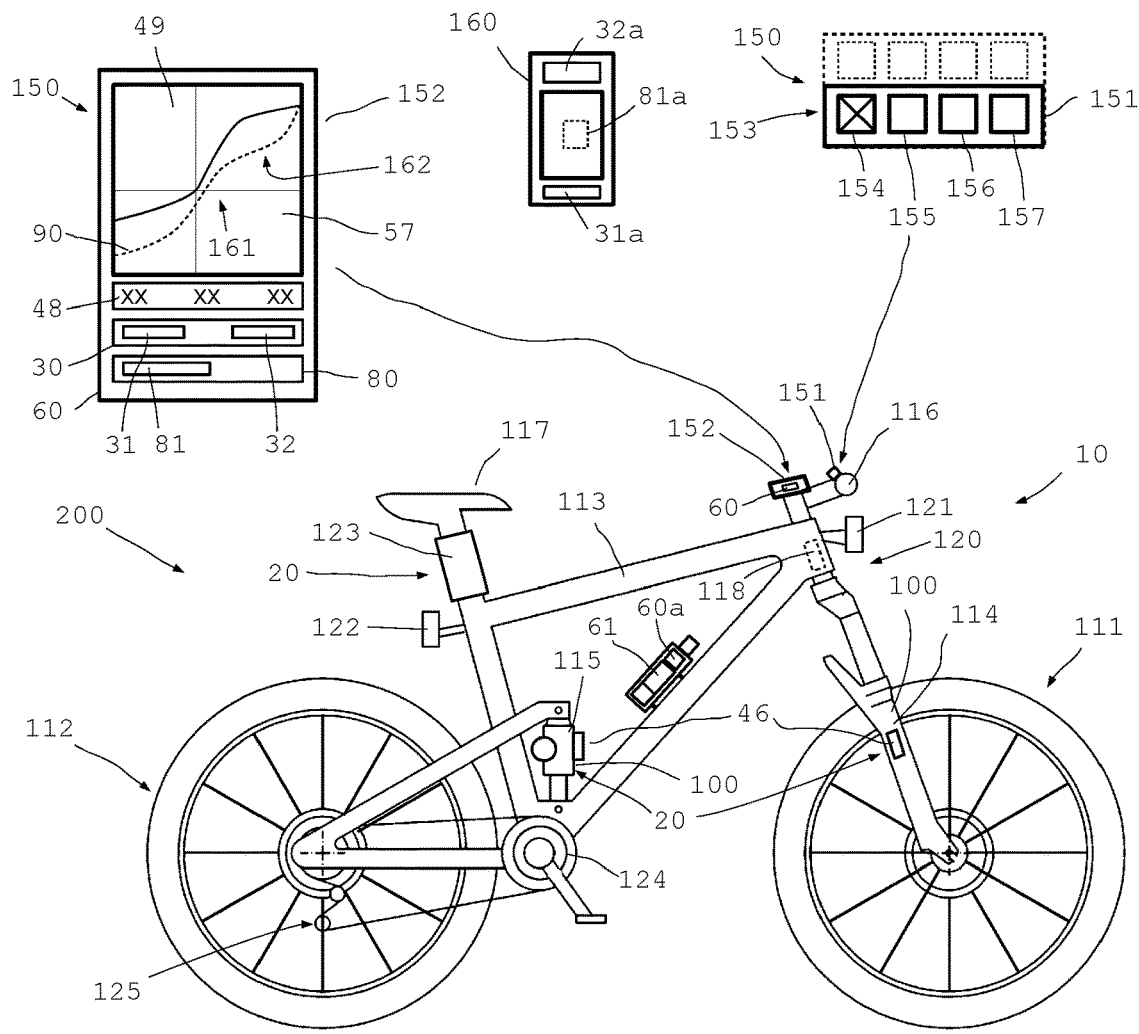
FIG. 1 a schematic view of a bicycle equipped with a bicycle component according to the invention.

FIG. 1 shows a schematic illustration of a bicycle 200 which is configured as a mountain bike and comprises a frame 113 and a front wheel 111 and a rear wheel 112. Both the front wheel 111 and the rear wheel 112 are equipped with spokes and may be provided with disk brakes. A gear shift device 125 serves to select the transmission ratio. Furthermore, the bicycle 200 comprises a steering device 116 with a handlebar. Furthermore, a saddle 117 is provided which is automatically or manually adjustable by way of a height-adjustable seat post 123. The bicycle 200 may be provided with a front light 121 and a rear light 122.

The bicycle 200 comprises (at least) two shock absorbers 100, a suspension fork 114 which receives the front wheel 111, and the rear wheel damper 115 between the frame and the rear wheel 112. A shock absorber at the seat post is also possible. The shock absorbers 100 at the front wheel and the rear wheel together with the control device 60 form a suspension control 300.

It is also possible for the bicycle 200 to be configured as a racing bicycle and having no shock absorbers. A controlled device which is a bicycle component 20 can then, e.g. be power metering or the gear shift device or a lighting set if any. A mountain bike may be additionally or instead provided, e.g. with controlled shock absorbers 100 (front and/or rear).

A central control device 60 is provided and is accommodated on the handlebar 116 e.g. in the bicycle computer. The control device 60 may also be disposed together with a battery unit 61 in a water bottle-like container and disposed on the down tube where a water bottle is otherwise disposed, or it may be provided in the frame. It is also possible to provide the battery unit 61 in the form of a battery pack at the frame. The battery unit 61 serves as a general power supply and to supply an electric auxiliary drive 124 if any, which serves as a pedaling support while also permitting automatic riding. The control device 60 may be fixedly mounted or be provided for demounting and exchanging. The control device 60 may e.g. be exchangeable such as accumulator batteries on E-bikes.

The central control device 60 serves as a suspension control 300, controlling both the suspension fork 114 and the rear wheel shock absorber 115, separately and in particular in synchrony. Control of the shock absorbers 100 and further bicycle assemblies 10 and particular bicycle components 20 may be provided in dependence on many different parameters and is also done by way of sensor data. Optionally, the length or height of the seat post 117 may be adjustable and/or the suspension and/or damping characteristics of the seat post 117 may be adjustable. It is possible to also control by way of the central control device 60 the shifting system for adjusting different transmission ratios. Capturing an angular position may be provided by means of an angle sensor 118 which detects the angular position of the bicycle 200 in the longitudinal and/or transverse direction.

Additionally, each of the shock absorbers 100 comprises at least one control device 46 at an electronic unit provided to be exchangeable. Each of the electronic units may comprise a separate battery unit. However, energy supply is preferred by way of the central battery unit 61 or energy supply may be supported or operated by a dynamo or the like. Assist by piezo elements is also possible which generate from the vibrations electric energy which can be stored.

The suspension control 300 and the central control device 60 are operated via operating devices 150. Two operating devices 150 are provided, namely an actuating device 151 and an adjustment device 152. The actuating device 151 comprises mechanical input units 153 at the lateral ends or in the vicinity of the lateral ends of the handlebar 116. The adjustment device 152 may be configured as a bicycle computer and may likewise be positioned at the handlebar 116. The bicycle computer preferably contains the (central) control device 60.

Alternately, it is possible to employ a smartphone 160 or a tablet computer or the like for the adjustment device 152 which is, for example, located in the user's pocket or backpack while no modifications to the settings need to be made. The smartphone is provided with sound converters 31*a* and 32*a* for acoustic input and output and a processor 81*a* for local processing. Alternatively, or supplementarily, recognition and processing voice signals may be provided by an assigned operating device 150.

The actuating device 151 comprises three mechanical input units serving as the controls 154, 155, 156 for operating the shock absorber 100. It is possible for an actuating device 151 for the suspension fork 114 to be disposed in the vicinity of one of the ends of the handlebar 116 and in particular inwardly of or adjacent to the grip. It is preferred to provide another actuating device 151 for the rear wheel shock absorber 115 in the vicinity of the other of the ends of the handlebar and inwardly of or adjacent to the grip. It is also possible to control both shock absorbers in synchrony via an actuating device 151. It is also possible to dispose at one of the lateral ends of the handlebar 116 an actuating device for example with six different controls for adjusting the two shock absorbers 100.

The actuating device 151, which is considerably more robust and sturdier than the operating device 152, is fixedly mounted to the handlebar 116. Each of the controls 154 to 156 designed as pressure switches or push buttons preferably shows protection according to IP54, or better according to IP67 under DIN EN 60529. Protection from impacts is provided at least according to IK06 under DIN EN 622622. The controls 154 to 156 are thus sufficiently protected in normal operation so that the controls are not damaged during operation due to usual shocks or the like. Moreover, the robust controls 154 to 156 provide for reliable operation even while riding downhill or the like.

In contrast to this, the adjustment device 152, which is for example clipped to the handlebar, offers a considerably larger number of and/or more clearly arranged adjustment options and it may be employed for modifying a displayed characteristic damper curve in at least two or more sections 161, 162 etc. for setting the desired damper properties.

The adjustment device 152 has a display 49 and may also output data 48 for example relating to the damper settings or alternately comprise data about the current traveling speed etc. The smartphone may be the adjustment device 152. In addition to or instead of modifying the damping, at least one spring characteristic or the characteristic of suspension may be modified via the adjustment devices 150 and 152. In particular, the suspension hardness in compression or rebound may be influenced. Moreover, the rest position may optionally be set. One can for example, lower the suspension fork 114 in (steep) mountain rides so as to reduce the inclination angle of the bicycle 200.

In this exemplary embodiment, the adjustment device 152 is equipped with, or configured as, the control device 60. The control device 60 comprises at least one acoustic device 30 having at least one sound converter 31, 32. This control device 60 comprises an acoustic device 30 having two sound converters 31, 32. The sound converter 31 serves as a capturing device, and in particular, a microphone and the sound converter 32, as a sound output device and in particular a loudspeaker.

This control device 60 comprises a processing unit 80 with a processor 81. The sound converter 31 captures a speech command 85 of the rider and converts the acoustic signals to electric signals which are digitized in the sound converter 31 itself or in the processing unit 80. A speech recognition routine assigned to the processor analyzes the noise signals of the speech command and recognizes a control command.

Then the control device 60 executes the control command. A preferred variant provides for the user to query e.g. the position of the lockout or the speed that the gear shift device is currently set to. The user receives a reply by voice output. In addition, the information may also show on the display 49.

The display 49 is in particular configured as a graphic operating and output unit or a touch screen 57.

The adjustment device 152 may also serve as a bicycle computer, displaying data about the current speed, and the average speed and/or kilometers per day, per tour, per lap, and total. The information may be output by voice output. It is also possible to display and/or to output by voice the current position, the current elevation of the route traveled and of the route profile, and also the estimated operational range under the current damping conditions and/or electric driving conditions.

By way of speech commands, the central control device 60 can influence the suspension fork 114 configured as a damper device and also the rear wheel damper 115, and/or can output status information. Adjustment of the damper device 100 by the control device 60 will be explained in detail with reference to the FIGS. 3*a* and 3*b*.

The control device of the bicycle assembly 10 or the bicycle 200 is configured and set up to convert a noise signal captured by the acoustic device to a control command and to execute it when an actuating device 151 is actuated in an assigned time slot and to convert a noise signal captured with the acoustic device to a control command and to execute it without acknowledgment by an actuating device 151 (preferably exactly only) if the noise signal captured by the acoustic device and converted to a control command only serves to output information.

The control device is configured and set up to basically execute an acoustic or speech control command only if an actuating device is actuated in an assigned time slot, and to execute an acoustic or speech control command without acknowledgment by an actuating device only exactly in the case that the control command only serves to output information (or is not safety critical).

Figure 2:
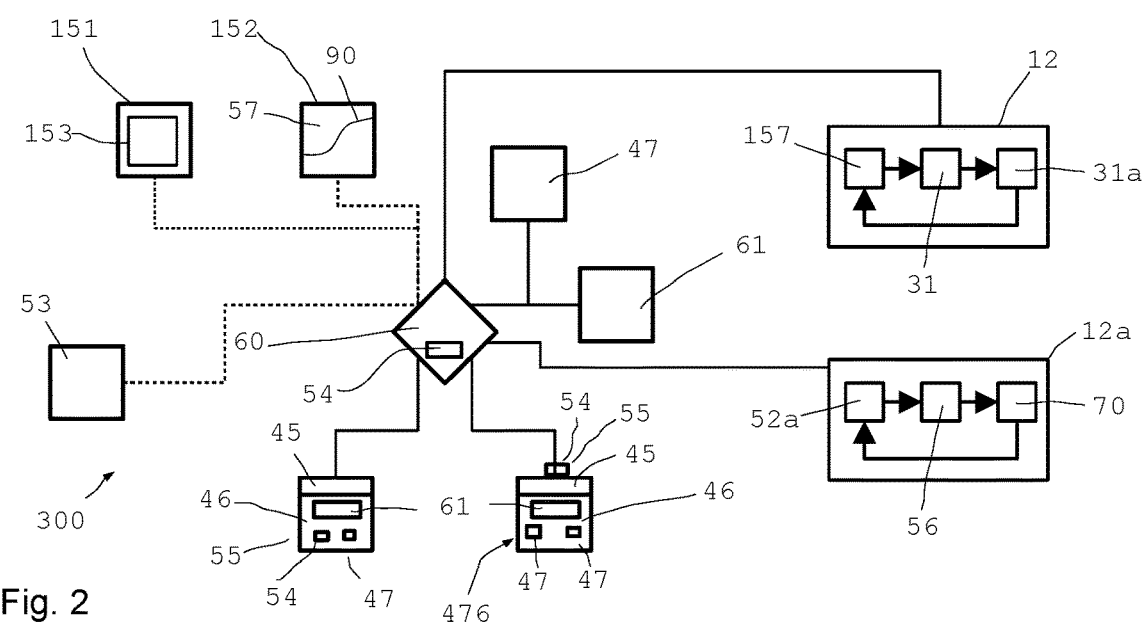
FIG. 2 a schematic view of the control configuration structure of the bicycle according to FIG. 1.

FIG. 2 shows a schematic illustration of the suspension control 300 and the communication links of some of the components involved. The central control device 60 may be connected with the individual bicycle components either wire-bound or wireless. The control device 60 may be connected with the other bicycle components 20 for example through WLAN, Bluetooth, ANT+, GPRS, UMTS, LTE, or other transmission standards. As a rule, the control device is not connected with the bicycle components 20 through a public mobile radio network. Optionally, the control device 60 may comprise a wireless internet 53 connection via the link shown in a dotted line for data back-up for example in the cloud or the like. Operating the voice control does not require an internet connection. For a wireless connection for evaluating speech commands the units involved are distanced from one another less than preferably 5 m or 2 m.

The control device 60 is linked with the battery unit 61. Furthermore, the control device 60 may be linked with a sensor device 47 or with multiple sensors. The operating devices 150, namely the actuating device 151 and the adjustment device 152, are at least temporarily coupled with the control device 60 either wire-bound or wireless. Although the actuating device 151 is preferably coupled with the control device wire-bound, it may be linked wireless and may be provided with a separate battery such as a button cell or the like.

The actuating device 151, which is robust in structure, comprises at least one mechanical input unit 153 in the shape of a switch or the like for outputting switching commands to the control device 60 for switching at least one damper property and/or spring characteristic. This may for example be, activating a lockout or activating a see-saw suppression or adjusting the damper hardness and/or the suspension hardness. Preferably, a separate operating knob or the like is provided for each of these properties. Alternately, it is possible to use one single, mechanical input unit 153 for switching between options. The mechanical input unit 153 or a mechanical input unit may serve for modifying the springing properties. For example, the suspension fork can be lowered and the rear wheel damper can be adapted accordingly.

One of the mechanical input units 153, e.g. the mechanical input unit 157, is preferably used to enable acknowledging or announcing a speech command. This is advantageous for ensuring that only the rider concerned modifies the settings of the components of his bicycle but a rider next to or following him does not. For announcing, the rider actuates the push button 157 and immediately thereafter speaks his speech command. For acknowledging, he first speaks his speech command and immediately thereafter acknowledges the command by actuating the push button 157. Announcing or confirmation/acknowledgment causes acceptance and execution of the speech command. Another protective measure may be provided by setting recognition of the speaker by way of adjustable precision (e.g. precision >50% or >75% or >90%). This reliably prevents an execution of undesired speech commands even for riders traveling in a pack where a number of riders have this system.

The adjustment device 152 comprises a graphical control unit such as a touch-sensitive screen and can, among other things, show on the display 49 the current characteristic damper curve 90. For example, touching and dragging the characteristic damper curve in single points displaces the characteristic damper curve to the sides or up and down, basically as desired. The individual points are preferably linearly linked. The individual points may also be linked dynamically via splines so as to obtain a rounded characteristic damper curve.

The control device 60 is connected with control devices 46 of the shock absorbers 100 at the front wheel and the rear wheel via network interfaces 54 or radio network interfaces 55. The control device 46 optionally provided at each of the shock absorbers 100 takes care of local controlling and may comprise a battery each, or alternately, it may be connected with the central battery unit 61. It is preferred to control both shock absorbers via the control device 60.

Preferably, each of the shock absorbers 100 is provided with at least one sensor device 47 for obtaining relative motions between the components 101 and 102 and in particular for determining positions of the components 101 and 102 relative to one another. The sensor device 47 may be configured as, or may comprise, a displacement sensor. After obtaining a characteristic value of the relative speed, the pertaining damping force and a suitable spring force are set by way of the characteristic damper curve 90 of the shock absorber 100 stored in the memory device 45. A suitable spring force may be determined via the weight of the rider. The weight of the rider can be derived, for example, by automatically determining the SAG position as a rider has mounted the bicycle. The compression travel as a rider mounts the bicycle allows conclusions about a suitable air pressure in the fluid spring or gas spring, which is then automatically set or approximated immediately or during operation.

The control device 60 again controls the suspension during operation. Another function is the response to speech commands and voice output.

FIG. 2 schematically shows the control cycle 12 which is stored in the memory device 45 and is backed up in or programmed into the control device 60. The control cycle 12 is executed during operation periodically, and in particular continuously periodically, or upon request. The existing sound converters 31 and 31a are queried periodically upon actuation of the push button 157 to evaluate an announced speech command. Operating the control device in confirmation mode involves continuous listening, performing voice evaluation, and executing a speech command if pressing the push button 157 follows immediately.

Another control cycle 12a controls the damper devices 1. In step 52a, the sensors 47 capture a current relative motion or relative speed of the first component 101 versus the second component 102. In step 52a, a characteristic value is derived from the values of the sensor 47 or the sensors which is representative of the current relative speed. Thereafter, in step 56 the pertaining damping force to be set is then derived from the current respectively obtained characteristic value taking into account the predetermined or selected characteristic damper curve. A measure for the field intensity or current intensity to be currently set is derived therefrom with which the damping force to be set is at least approximately achieved. The measure may be the field intensity itself or alternately it may e.g. indicate the current intensity with which the damping force to be set is at least approximately achieved.

In the subsequent step 70, the field intensity to be currently set is generated or the respective current intensity is applied to the electric coil device 11 which serves as the field generating device, so that within one single cycle or onetime period of the control cycle 12a, the damping force is generated as it is provided for the selected or predetermined characteristic damper curve relative to the current speed ratio of the first component versus the second component. Thereafter, the next cycle starts and step 52a is performed once again. In each cycle or at specific time intervals or given specific events, the position or the spring force of the suspension device 26 is checked. To this end, the strength of the spring force of the positive chamber 270 and the strength of the spring force of the negative chamber 280 is checked or determined in the fluid spring 260 (see FIGS. 3a and 3b). If a harder fluid spring 261 is desired, for example the second positive chamber 272 can be deactivated so as to provide the fluid spring 260 with a steeper spring force curve. Alternately, the volume of the negative chamber 280 is modified or a position 292 of the equalizing device 290 is changed.

Figure 2A:
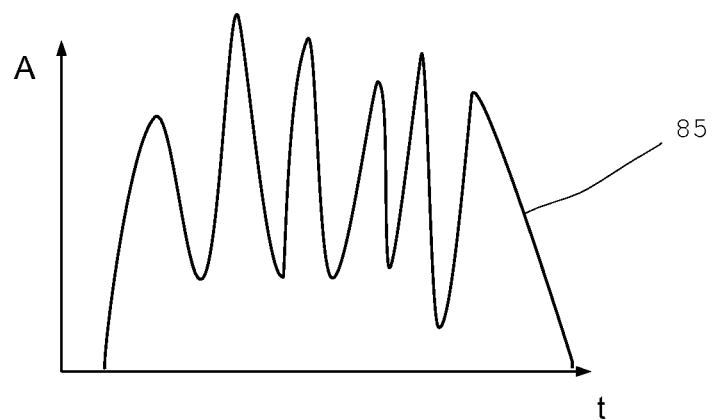
FIG. 2a a simplistic view of the time sequence of an amplitude of a speech command.

FIG. 2a shows a simplistic view of the amplitude of a sound signal 85 such as a speech command over time. An analysis of the time curve serves to convert the actual language to a control command.

Figure 2B:
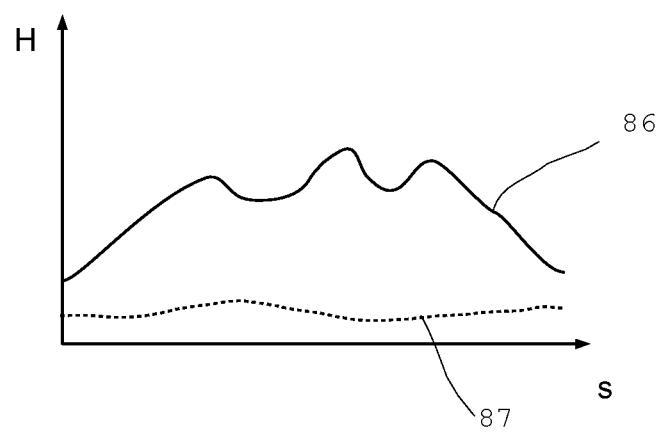
FIG. 2b a simplistic view of the height profiles of two bicycle tours.

FIG. 2b shows a simplistic view of two height profiles of two different bicycle tours 86, 87. While the tour 87 shows a relatively small number of low gradients, the tour 86 runs across steep climbs and downhill rides. Depending on the type of tour planned by the rider, he can give out a suitable speech command at the beginning of the tour so that the control device (pre-) sets the pertaining bicycle components accordingly.

Figure 3A:
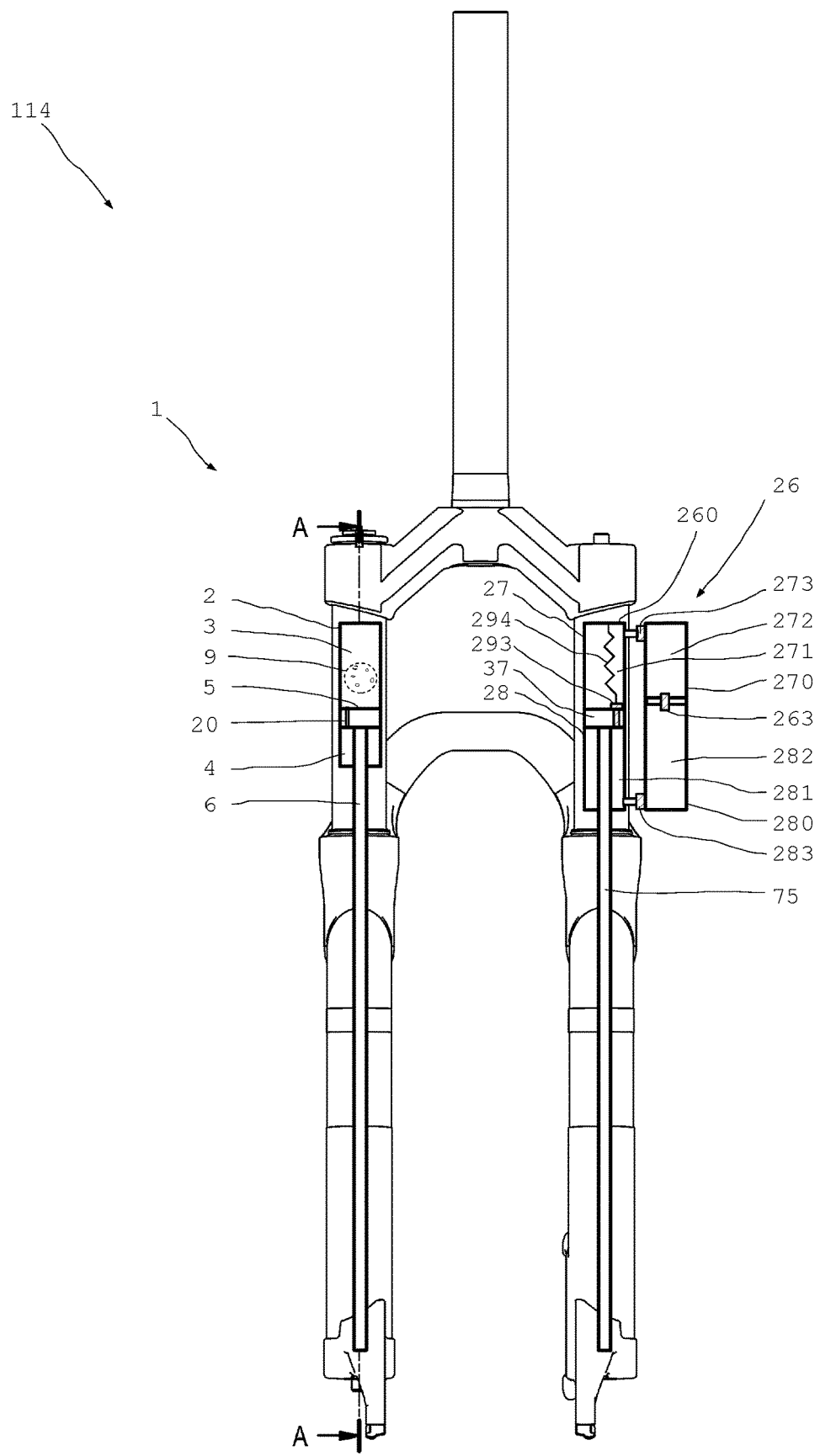
FIG. 3a a schematic view of a suspension fork of the bicycle according to FIG. 1.
Figure 3B:
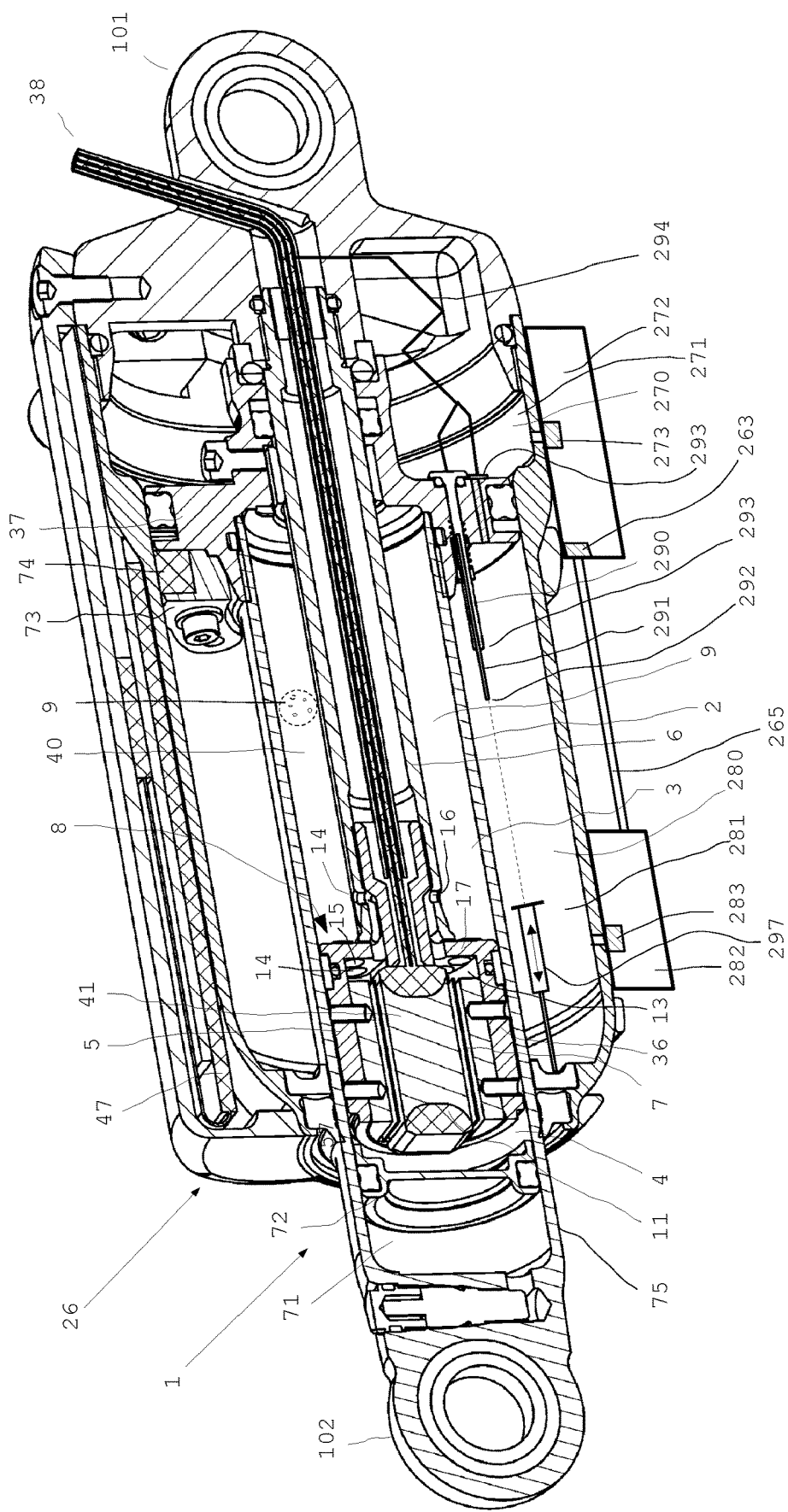
FIG. 3b a schematic sectional view of a shock absorber of the bicycle according to FIG. 1.

FIG. 3a shows a simplistic view of a suspension fork 114 as it is employed for the front wheel 111, and FIG. 3b shows the rear wheel damper 115, which will be jointly described below.

The suspension fork 114 comprises a shock absorber 100. The shock absorber 100 comprises a damper device 1 in one leg of the suspension fork and a spring device in the other leg of the suspension fork. In other configurations, the damper device 1 and the spring device 26 may be jointly disposed in one leg.

The shock absorber 100 is fastened by the first end serving as the component 101 and the second end serving as the component 102, to different parts of the supporting structure 120 or the frame 113 for springing and damping relative motions.

The damper device 1 comprises a first damper chamber 3 and a second damper chamber 4 in one combined damper housing 2. The two damper chambers 3 and 4 are separated from one another by the damper piston or damping piston 5 in or at which a magnetorheological damping valve 8 comprises a damping duct 20 through which the magnetorheological damping fluid 9 (MRF) courses. While the damper housing 2 is fastened to the upper part of the suspension fork 114 and thus to the frame 113, the damper piston 5 is connected with the lower dropout via the piston rod 6.

The other suspension strut of the suspension fork has disposed in it the suspension device 26 which comprises a spring unit 260 configured as a fluid spring 261. The suspension device comprises a housing in which the spring piston 37 that is linked to the piston rod 75 separates a positive chamber 270 from a negative chamber 280. The positive chamber 270 forms a positive spring and the negative chamber 280 forms a negative spring the spring force of which tends to be lower in the rest position but is opposed to the spring force of the positive spring. This achieves good responsivity since the fluid spring 261 will respond already to weak shocks. The fluid spring 261 is filled with a fluid and presently with a gas and preferably with air.

The positive spring comprises two chamber sections 271 and 272 which can be separated from or connected with one another by means of a control valve 273 as required. The negative spring comprises two chamber sections 281 and 282 which can be separated from or connected with one another by means of a control valve 283 as required.

The chamber section 272 of the positive chamber 270 and the chamber section 282 of the negative chamber 280 can be interconnected via the control valve 263. In this way, the control valves 263, 273 and 283 can equalize the pressure between the positive chamber and the negative chamber in every desired spring position so as to change the characteristic of the fluid spring 261. The control valves 263, 273 and 283 serve as actuators the operation of which is controlled by the control device 60. Activation may be provided manually or by way of speech commands. Status requests and settings may be requested by way of speech commands.

The bicycle allows freely setting the rest position, and the suspension fork may also be lowered for example for hilly riding. This can also be done, e.g. by way of a speech command "lower" or "lower the fork". After e.g. acknowledging the speech command by means of a mechanical push button, the fork is lowered.

In a rear wheel shock absorber, an additional volume if any in a chamber section can be deactivated by way of a speech command and thus the springing at the rear wheel can be set harder for uphill rides. It is possible to provide only one of the control valves 263, 273 and 283. For example, only the control valve 273 (or 283) may be provided so that opening and closing the control valve 273 (or 283) will modify the volume of the positive chamber 270 (negative chamber 280) and thus the spring characteristic of the spring unit 260.

It is also possible for the suspension fork 114 to comprise, in the suspension piston 37 one control valve 293 only which is connected with the control device 60 via a cable or a control line 294. Opening the control valve 293 enables gas exchange in any desired axial position of the suspension piston 37. Pressure compensation in a suitable position modifies the rest position and results e.g. in lowering, or in transfer to the normal position of a lowered suspension fork.

Suitably controlling the control valves may also influence the pressure level in the positive chamber and/or the negative chamber.

FIG. 3b shows a simplistic cross-sectional view of a shock absorber 100 which is presently employed for example in the rear wheel damper 115.

The shock absorber 100 comprises a damper device 1. The shock absorber 100 is fastened by its first end serving as the component 101 and the second end serving as the component 102, to different parts of the supporting structure 120 or the frame 113 for damping relative motions.

In the damper housing 2, a damping piston unit 40 is provided which comprises a damping piston 5 with a damping valve 8 and a piston rod 6 linked therewith. The damping piston 5 is provided with the magnetorheological damping valve 8 therein which presently comprises a field generating device, and in particular, an electric coil 11 for generating a suitable field intensity. A cable 38 serves as a power supply and/or data transmission. The magnetic field lines run in the central region of the core 41 approximately perpendicular to the longitudinal extension of the piston rod 6 and thus pass through the damping ducts approximately perpendicular. This causes the magnetorheological fluid present in the damping ducts to be effectively influenced so as to allow efficient damping of the flow through the damping valve 8. The shock absorber 100 comprises a first damper chamber 3 and a second damper chamber 4 separated from one another by the damping valve 8 configured as the piston 5. In other configurations an external damper valve 8 is possible which is disposed external of the damper housing 2 and connected via supply lines.

The first damper chamber 4 is followed toward its end 102 by the equalizing piston 72 and thereafter the equalizing space 71. The equalizing space 71 is preferably filled with a gas and serves to equalize the piston rod volume which in compressing enters into the entire damper housing 2.

Magnetorheological fluid 9 serving as the field-sensitive medium is present not only in the damping valve 8, but presently in the two damping chambers 3 and 4 on the whole.

The flow duct 7 between the first damper chamber 3 and the second damper chamber 4 extends, starting from the second damper chamber 4, firstly through the fan-type damping ducts which at the other end lead into the collection chamber or collection chambers. The magnetorheological fluid collects there after exiting the damping ducts before passing through the flow apertures 14, 15 into the first damping chamber 3. In compressing, i.e. in the compression stage, flow passes through all of the flow apertures 14, 15. This means that the major portion of the flow presently passes through the flow apertures 15, and the one-way valves 17 at the flow apertures 15 open automatically such that the magnetorheological fluid can pass out of the second damper chamber 4 into the first damper chamber 3.

In the compressed state illustrated, the first damper chamber 3 is radially entirely surrounded by the second spring chamber 280 of the spring device 26. This allows a particularly compact structure.

The shock absorber 100 comprises an equalizing device 290 which enables pressure compensation between the positive chamber 270 and the negative chamber 280. The position of pressure compensation is adjustable. To this end, the equalizing device 290 may comprise e.g. a telescopic equalizing plunger 291 which can extend out of the spring piston 37 to different lengths. The extending and retracting of the equalizing plunger may, in particular occur indirectly by way of a speech command. As a rule, the rider will not issue the speech command "extend plunger". What is possible is the speech command "springing softer" or "damper softer" or "rear damper softer" or the like, which results or may result in indirect changes to the position of the equalizing plunger 291.

By way of extending, the extendable equalizing plunger 291 will sooner (or later) reach a stopper at the end of the negative chamber 280. The equalizing device 290 may be connected with the control device 60 by electric cable 294. As the equalizing plunger 291 abuts, it opens a fluid opening so as to cause gas compensation and thus pressure compensation between the positive chamber 270 and the negative chamber 280.

In rebound, the equalizing device 290 will automatically close again. Depending on the compensating position, the pressure relationships set at the fluid spring 261 differ so as to influence the suspension accordingly. It is also possible to provide the end of the negative chamber 280 with an adjustable or displaceable stopper for a stationary equalizing plunger 291 to obtain variations of the spring characteristic. Alternatively, or in addition, a length-adjustable stopper 297 may be provided against which the equalizing plunger 291 abuts in an adjustable and variable position 292 or 296. As the equalizing plunger 291 abuts, the equalizing plunger 291 opens the control valve 293 or forms a flow aperture through which the pressure can be compensated between the positive chamber and the negative chamber.

FIG. 3b shows a position 292 with extended equalizing plunger 291. The equalizing plunger 291 may be retracted so as to obtain another position 296 in which the equalizing device 290 opens. The equalizing plunger 291 is preferably spring-loaded.

Furthermore, an electrically controlled equalizing valve 293 which may be supplied with energy via the electric cable 294 may be provided in suitable positions to compensate part or all of the pressure between the positive chamber 270 and the negative chamber 280.

Furthermore, the positive chamber 270 may include a number of chamber sections 271, 272. In addition to the basic chamber being the chamber section 271, the chamber section 272 may be activated as needed or required for changing and in particular reducing the spring hardness. Alternately, the chamber section 272 may be deactivated and separated from the chamber section 271 when the spring hardness is to be changed and in particular increased.

In analogy, the negative chamber 280 may consist of a number of chamber sections 281, 282. In addition to the first chamber section 281, the second chamber section 282 may be activated as needed or required. Correspondingly, the chamber section 282 can be deactivated and separated from the chamber section 281. In another configuration, the positive chamber 270 comprises chamber sections 271 and 272, and the negative chamber 280 comprises chamber sections 281 and 282. In this configuration, the equalizing device 290 comprises control valves 273, 283 and 263 and a connecting line 265 for interconnecting the chamber sections 272 and 282 as required.

When the three control valves 273, 283 and 263 open e.g. due to a speech command then the pressure will be compensated between the positive chamber 270 and the negative chamber 280. The position 292 of pressure compensation can be selected as desired and independently of an equalizing plunger 291. Therefore, this configuration does not require any equalizing plunger 291 nor any control valve 293 in the piston 37, nor any adjustable stopper 297. The chamber sections may in all the cases be activated and deactivated in compression or rebound in dependence on the position.

The spring piston 37 is provided at the end of the damper housing 2. Disposed threat is a holder 73 supporting a magnet 74. The magnet 74 is part of a sensor 47. The sensor 47 comprises a magnetic potentiometer which captures a signal that is representative of the position of the magnet 74 and thus of the spring piston 37. This potentiometer 47 does not only permit to determine a relative location but presently also permits to determine the absolute stage of compression or rebound of the shock absorber 100. It is also possible to employ an ultrasonic sensor for capturing a distance.

The invention is advantageous in all the types of bicycles and in particular in sports bicycles. For a mountain bike, for example both of the dampers (suspension fork and rear wheel damper) and also the gear shift device may be provided for voice control. Status queries output by voice are also possible of the damper device and/or the gear shift device and other components. The language for input and output can be selected, such as German, English, French, Italian, Spanish, Chinese, Japanese, etc. An advantage is the simple operation. As a tour begins the user may select a distance or track and then the control device 60 automatically selects suitable settings. Synchronization with the internet may be done to find optimal settings.

The user may query status information on particular bicycle components via speech commands which status information is in particular given via voice output.

Preferably, there will be feedback as a speech command is given and acknowledged. Critical commands or fuzzy recognition or association of a speech command may result in refusal to execute such speech command and acknowledgment may be delivered by way of other signals. It is preferred to require, for example actuation of a mechanical push button or the like for acknowledging and/or announcing speech commands. Users can actuate these push buttons or switches e.g. directly on the handlebar.

The invention also allows the control device 60 to actively indicate faults for example if the damper heats up or knockout is imminent.

A sequential program may be provided for setup. After the purchase, the user is prompted e.g. by voice control to perform specific steps and settings and (optionally as required) to carry out speech training.

While particular embodiments of the present bicycle, bicycle assembly and method have been described herein, it will be appreciated by those skilled in the art that changes and modifications may be made thereto without departing from the invention in its broader aspects and as set forth in the following claims.

| List of reference numerals: | |
|---|---|
| 1 | damper device |
| 2 | damper housing |
| 3, 4 | damper chamber |
| 5 | damping piston |
| 6 | piston rod |
| 7 | damping duct |
| 8 | damping valve |
| 9 | MRF |
| 10 | bicycle assembly |
| 11 | coil device |
| 12, 12a | control cycle |
| 14-16 | aperture |
| 17 | one-way valve |
| 20 | bicycle component |
| 26 | spring device |
| 30 | acoustic device |
| 31, 31a | sound converter, microphone |
| 32, 32a | sound converter, loudspeaker |
| 37 | spring piston |
| 38 | cable |
| 40 | damping piston unit |
| 41 | core |
| 45 | memory device |
| 46 | control device |
| 47 | damper sensor, sensor |
| 48 | data |
| 49 | display |
| 52, 52a | step |
| 53 | internet |
| 54, 55 | interface |
| 56 | step |
| 57 | touchscreen, graphical control unit |
| 60 | control device |
| 61 | battery unit |
| 70 | step |
| 71 | equalizing space |
| 72 | equalizing piston |
| 73 | holder |
| 74 | magnet |
| 75 | piston rod |
| 80 | processing unit |
| 81, 81a | processor |
| 85 | speech command |
| 86, 87 | tour |

-continued

| List of reference numerals: | |
|---|---|
| 90 | characteristic damper curve |
| 100 | shock absorber |
| 101, 102 | component |
| 111, 112 | wheel |
| 113 | frame |
| 114 | suspension fork |
| 115 | rear wheel damper |
| 116 | handlebar |
| 117 | saddle |
| 118 | angle sensor |
| 120 | supporting structure |
| 121, 122 | light |
| 123 | seat post |
| 124 | drive motor |
| 125 | gear shift device |
| 150 | operating device |
| 151 | actuating device |
| 152 | adjustment device |
| 153 | input unit |
| 154-157 | operating member |
| 160 | smartphone |
| 161-162 | range |
| 200 | bicycle |
| 260 | spring unit |
| 261 | fluid spring |
| 263 | control valve |
| 265 | line |
| 270 | positive chamber |
| 271, 272 | chamber section |
| 273 | control valve |
| 280 | negative chamber |
| 281, 282 | chamber section |
| 283 | control valve |
| 290 | equalizing device |
| 291 | equalizing plunger |
| 292 | position |
| 293 | equalizing valve |
| 294 | cable, control line |
| 296 | position |
| 297 | stopper |
| 300 | suspension control |

The invention claimed is:

1. A bicycle assembly for an at least partially muscle-powered bicycle with a control device and at least one bicycle component controlled by the control device whose operating state is variable during operation, comprising:
    at least one acoustic device having at least one sound converter configured for outputting information, controlled by the control device, on the operating state of the bicycle component by means of the acoustic device, and
    at least one acoustic device having at least one sound converter configured for capturing noises by means of the acoustic device, converting the noises to noise signals, and utilizing the noise signals for controlling the control device,
    wherein the control device comprises at least one processor and is configured to convert the noise signals to at least one control command and to execute the at least one control command when an actuating device is actuated in an assigned time slot.

2. The bicycle assembly according to claim 1, wherein the control device is configured to execute one said control command without acknowledgment by an actuating device if the control command only serves to output information.

3. The bicycle assembly according to claim 1, wherein the at least one bicycle component is selected from the group consisting of: a front wheel, a rear wheel, a damper device such as a damper device for damping the front wheel and a damper device for damping the rear wheel, at least one sensor for capturing at least one state of a damper device or another component, a front light, a rear light, a height-adjustable seat post, a gear shift device, an electric drive motor, a battery unit, a pressure measuring device for the air pressure in the front wheel, a pressure measuring device for the air pressure in the rear wheel, a pressure measuring device for air pressure, a speed sensor, an angle sensor, a pedaling frequency sensor, a position sensor, a power sensor, and a height sensor.

4. A two-wheeled vehicle comprising at least one frame, at least one front wheel and at least one rear wheel and at least one bicycle assembly according to claim 1.

5. The bicycle assembly according to claim 1, wherein the control device is configured to execute the at least one control command only if the speaker shows adequate authorization.

6. The bicycle assembly according to claim 1, wherein the control device acknowledges the at least one control command by means of an acknowledgment signal.

7. The bicycle assembly according to claim 1, wherein the control device controls the at least one bicycle component that is activated by way of the at least one control command.

8. The bicycle assembly according to claim 1, wherein the control device is configured to output warnings by means of the acoustic device if the at least one bicycle component exceeds a specified temperature or if the air pressure in a tire changes.

9. The bicycle assembly according to claim 1, wherein the control device is configured, after receiving a control command, to output or acknowledge at least one status information by at least one of:
   acoustically by means of the acoustic device,
   optically by means of a display device, and
   by means of a vibrating device.

10. The bicycle assembly according to claim 1, wherein a basic setting can be set for at least one ride by means of the acoustic device.

11. The bicycle assembly according to claim 1, wherein the noise signals are evaluated to recognize at least one of a type of terrain and/or damage to the at least one bicycle component.

12. The bicycle assembly according to claim 1, wherein the at least one bicycle component comprises a suspension control.

13. A bicycle assembly for an at least partially muscle-powered bicycle, comprising:
   at least one shock absorber device;
   at least one control device;
   at least one of a damper device and a spring unit that is controlled by means of the control device; and
   an acoustic device is provided for capturing noises which are converted at least one control commands for controlling the control device,
   wherein the control device comprises at least one processor configured to execute the at least one control command when an actuating device is actuated in an assigned time slot.

14. The bicycle assembly according to claim 13, wherein the acoustic device is suitable and configured to output noises.

15. A method for operating a bicycle assembly or an at least partially muscle-powered bicycle with a control device and at least one bicycle component controlled by the control device whose operating state is variable during operation, the method comprising at least one of:
   outputting, by the acoustic device, information on the operating state of the bicycle component; and
   capturing noises by the acoustic device;
   converting the noises to noise signals; and
   utilizing the noise signals for controlling the control device,
   wherein the control device comprises at least one processor and is configured to convert the noise signals at least one control command and to execute the at least one control command when an actuating device is actuated in an assigned time slot.

* * * * *